US005702209A

United States Patent [19]

Mauchle

[11] Patent Number: 5,702,209

[45] Date of Patent: Dec. 30, 1997

[54] POWDER FEED DEVICE, ESPECIALLY FOR POWDER COATING MATERIAL

[75] Inventor: Felix Mauchle, Abtwil, Switzerland

[73] Assignee: Gema Volstatic AG, St. Gallen, Switzerland

[21] Appl. No.: 280,870

[22] Filed: Jul. 26, 1994

[30] Foreign Application Priority Data

Jul. 26, 1993 [DE] Germany .......................... P4325044.0

[51] Int. Cl.$^6$ .................................................. B65G 53/14

[52] U.S. Cl. ................................ 406/12; 406/14; 406/28; 406/93; 406/153

[58] Field of Search ................................ 406/10, 12, 14, 406/28, 93, 151, 153

[56] References Cited

U.S. PATENT DOCUMENTS 4,284,032 8/1981 Moos et al. .............................. 406/14
4,758,117 7/1988 Maki et al. .............................. 406/14
4,941,778 7/1990 Lehmann ................................ 406/28
5,271,695 12/1993 Bischof et al. ........................ 406/153

*Primary Examiner*—Gary C. Hoge

[57] ABSTRACT

A powder feed device, especially for powder coating material, with an injector (2), in which a partial vacuum is created by a feed air stream according to the principle of a Venturi pipe and powder is drawn out of a powder container (10) and transported. An additional air stream can also be added to the feed air stream. In a computer (24), a plurality of predetermined powder feed rates (m) is stored in memory, on a calibration diagram (50), along a first diagram axis, and a plurality of feed air rates (FV) is stored in memory along a second diagram axis, for predetermined total air rates (GV) (feed air and added additional air, if needed). The computer (24) contains a powder rate reference value input (52) to input a selected powder rate reference (m-ref) and calculates the necessary feed air rate (FV) and the necessary additional air rate for this value as a function of the predetermined total air rate (GV), and generates a feed air rate reference value (FV-ref) and an additional air rate reference value (ZV-ref) as a function of the calculation result.

20 Claims, 2 Drawing Sheets

POWDER FEED DEVICE, ESPECIALLY FOR POWDER COATING MATERIAL

FIELD OF THE INVENTION

The present invention relates generally to powder feed devices, and more particularly to a powder feed device, especially for powder coating material.

BACKGROUND OF THE INVENTION

Injectors which function according to the Venturi principle as jet pumps for the pneumatic feed of powder coating material are known from DE-PS 1 266 685 (U.S. Pat. No. 3,504,945). Spray devices in the form of spray guns for the electrostatic spray coating of objects with powder coating material are known from U.S. Pat. No. 4,196,465. It is known from DE-OS 39 26 624 A1 to pass an injector feed air stream and an additional air stream to an injector. The feed air stream serves to generate a vacuum which draws powder into the injector, and to transport the drawn-in powder to a spray device, by means of which the powder is sprayed onto an object to be coated. The additional air stream serves to adjust the level of partial vacuum or to maintain a predetermined or desired total air amount if the feed air amount drops below a predetermined value. In order for the total air stream amount to be held at a desired value, the feed air stream and the additional air stream are regulated separately, in such a manner that the total air stream amount has a desired constant value independent of the proportions of the feed air and the additional air stream amount levels. The air is needed to transport the powder. The total air stream must have a predetermined minimum speed, because pulsations of the powder/air mixture stream occur in the fluid lines when the speed of the powder/air mixture is below 10–15 m/sec. Too much air, or high air speeds, however, are undesirable, because this has an undesirable influence on the cloud of sprayed powder and the coating quality. An overly strong air stream can blow powder away from the surface to be coated. Depending on the requirements of the powder layer to be formed on the object to be coated, the powder flow rate (amount of powder fed per time unit) to the spray device is increased or decreased. A value for the powder rate in practice is 300 g/min. Depending on the required coating thickness to be deposited on the object to be coated, and as a function of other criteria, such as type of powder or surface shape of the object to be coated, it is desirable to increase or decrease the powder feed rate. In connection with such changes of the powder feed rate, the feed air rate and the additional air rate have to be adjusted, in each instance, so that the desired powder feed rate is generated, but the total air feed rate, consisting of the feed air rate and the additional air rate, remains constant or achieves a desired value. The settings of the air feed rate and the additional air rate required for this are undertaken by hand in DE-OS 39 26 624 A1. The feed air rates and the additional air rates are set by means of pressure regulators. A predetermined pressure results in a predetermined amount of conveyed air per time unit. Due to many unknown pressure drops and changing flow cross-sections in such powder feed device, the "pressure regulation" is not very accurate. "Volume regulation" which regulates the "volume of feed air conveyed per time unit" and the "volume of additional air conveyed per time unit" would be more accurate. Volume regulators and sensors for determining the air volume conveyed are known, but are not known or used in connection with the feed of powder.

OBJECT OF THE INVENTION

The invention is supposed to accomplish the task of creating a device with which the necessary adjustment of the feed air amount per time unit and the additional air amount per time unit is possible with little time or personnel effort being required, if a desired powder feed amount per time unit for a desired total amount of air conveyed per time unit is being set or changed.

Further characteristics of the invention are contained in the claims.

SUMMARY OF THE INVENTION

The present invention has the following advantages, in particular: after a calibration diagram for a certain powder system, particularly an electrostatic powder spray coating system, is stored in memory, the desired amount of powder conveyed per time unit can be changed in a simple manner, and with this change, the new amount of feed air conveyed per time unit and additional air conveyed per time unit required for this operation are automatically obtained, with the desired total air amount being maintained constant. Several diagram lines can be stored in memory in connection with the calibration diagram, each of which represents a certain total air amount conveyed per time unit, by means of which the feed air amount required for a certain powder amount can be designated upon one diagram axis and correlated with the powder amounts designated upon another diagram axis. This "correlation" means "reading" or "calculation" by the computer. The computer furthermore forms the difference between the total air amount and the resulting feed air amount. This difference is the value for the additional air amount which is required for the powder amount selected, and which can be "zero" in an extreme case. The invention makes remote control possible in such a manner that the computer and its signal inputs can be arranged at a location removed from the fluid lines of the feed air and the additional air. In contrast to this, in the state of the art, pressure regulators have to be set by hand directly at the lines carrying the additional air and the feed air. Another advantage of the invention is the possibility of using volume flow regulators for regu-lation of the feed air and the additional air, without complicated control circuits. The volume flow regulators can be followed by a pressure regulator, in order to achieve even better regulation accuracy.

BRIEF DESCRIPTION OF THE DRAWINGS

Various other objects, features, and attendant advantages of the present invention will be more fully appreciated from the following detailed description when considered in connection with the accompanying drawings in which like or corresponding parts are designated by like or corresponding reference numbers throughout the several views, and wherein.

DETAILED DESCRIPTION OF THE ILLUSTRATED EMBODIMENTS

Figure 1:
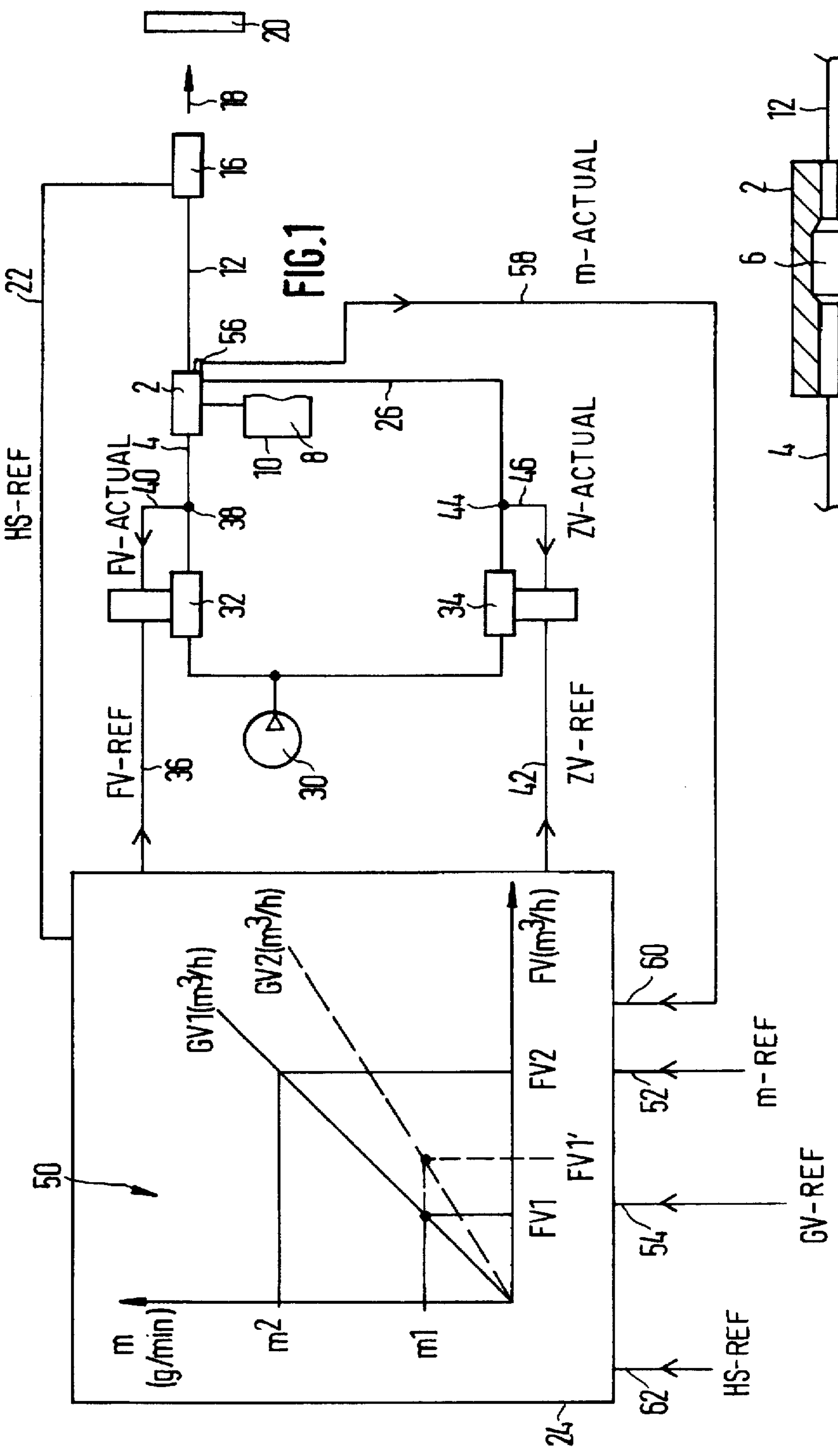
FIG. 1 is a schematic diagram of a powder feed system for supplying powder coating material as constructed according to the present invention.
Figure 2:
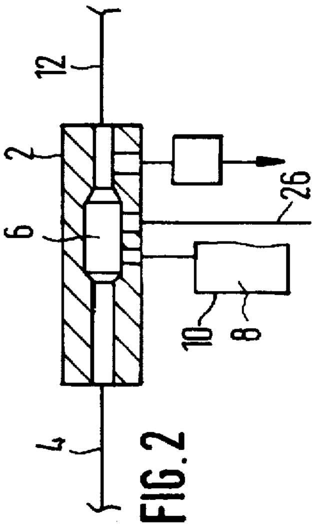
FIG. 2 is a longitudinal cross-sectional view through an injector of FIG. 1.

The powder feed device for powder coating material according to the present invention is shown in FIG. 1 and contains an injector 2, in which a feed air stream from a feed air line 4 creates a partial vacuum in a partial vacuum region 6 as seen in FIG. 2 and, according to the principle of a Venturi pipe, by means of which powder 8 is drawn out of a powder container 10 and then transported to an electrostatic spray device 16 by the feed air stream, through a powder-air line 12, which device charges the powder electrostatically and sprays it onto an object to be coated 20, along a direction indicated by the arrow 18. The spray device 16 can contain a high-voltage generator to charge the powder, or can be connected to an external high-voltage source. The drawings show an embodiment in which the high-voltage generator is integrated into the spray device 16 and the desired high voltage can be adjusted by means of an electrical line 22 and a computer 24. The high voltage for electrical charging of the powder can lie in the range between 0 and 140,000 volts, and can be optionally set. By means of an additional air line 26, an additional air stream can be added to the feed air stream in the partial vacuum region 6. In a modified embodiment, the additional air stream of the additional air line 26 can be introduced into the feed air stream at a location downstream from the partial vacuum region 6, either still within the injector 2 or at a location downstream from the injector 2 in the powder/air line 12. The feed air comes from a compressed air source 30 into the feed air line 4 by means of a feed air regulator 32. The additional air comes from the compressed air source 30 into the additional air line 26 by means of an additional air regulator 34. The two regulators 32 and 34 can be pressure regulators, but in the preferred embodiment shown they are volume regulators, which regulate the air volume flowing through them per time unit. The feed air volume regulator 32 receives a feed air volume reference value signal FV-ref from the computer 24 by means of an electrical feed air volume reference value line 36, and an electrical feed air volume actual value signal FV-actual from a feed air volume sensor 38 in the feed air line 4, by means of an electrical feed air volume actual value line 40. The feed air volume flow regulator 32 regulates the feed gas volume flowing through it per time unit as a function of this reference value signal and this actual value signal of the lines 36 and 40. The additional air volume regulator 34 receives an additional air volume reference value signal ZV-ref from the computer 24 by means of an electrical additional air volume reference value line 42, and an electrical additional air volume actual value signal ZV-actual from an additional air volume actual value sensor 44 in the additional air line 26, by means of an electrical additional air volume actual value line 46. The additional air volume flow regulator 34 regulates the additional air amount flowing through it per time unit as a function of this reference value signal ZV-ref of the line 42 and this actual value signal ZV-actual of the line 46. Since air varies in volume, depending on the pressure and temperature, the two volume pressure regulators 32 and 34 are calibrated in such a way that they convey a so-called standard cubic meter "Nm" per hour at an atmospheric pressure and a temperature of 0 C.

In the computer 24, a plurality of predetermined powder feed rates (amount of powder conveyed per time unit, "m", for example in g/min) is stored in memory in the form of a calibration diagram 50 on one diagram axis, while a plurality of feed air rates (feed air conveyed per time unit, "FV", for example in Nm/h) is stored in memory on a second diagram axis which is perpendicular to the powder feed rate axis, which are necessary to generate the powder feed rates "m" at a predetermined total air rate GV (total air conveyed per time unit, consisting of feed air and of additional air, if necessary) and were determined by experiments. For a predetermined total air volume rate GV1, for example, in m/h, a straight line is drawn on the calibration diagram. For a desired powder mass m1 or m2, the related feed air volume value FV1 or FV2 is obtained for the desired total air volume GV1 by going from the value m1 or m2, parallel to the feed air volume axis FV, to the total air volume straight line GV1, and then going parallel to the powder mass axis m to the feed air volume axis FV. On the feed air volume axis FV, the feed air volume values are plotted in Nm/h, for example. Each powder spray device 16 of the powder coating system can have feed air lines, additional air lines and powder/air lines which are different in length and in cross-section. For each of these different embodiments, a calibration diagram corresponding to the calibration diagram 50 can be stored in memory in the computer 24. In the calibration diagram 50, one line can be stored in memory for each of several total air volume values, by means of which a corresponding feed air volume value FV1 or FV2 can be determined for a predetermined powder mass value such as m1 or m2, for example. In the example shown in FIG. 1, a straight line is stored in memory in the diagram 50 for a total air volume value GV1 and another straight line is stored in memory for a total air volume value GV2, shown with a broken line. At a desired total air volume GV2, a feed air volume FV1' is necessary for a desired powder mass m1 per time unit. The computer 24 calculates the additional air volume value ZV, which is not contained in the diagram 50, but rather is given by the computer to the additional air volume flow regulator 34 as an additional air volume reference value signal ZV-ref on the electrical line 42, from the total air volume GV2 and the calculated air feed volume FV1'. The feed air volume value FV, for example FV1' or FV1 or FV2, which can be derived from the diagram, is given by the computer 24 to the feed air volume flow regulator 32 as an electrical feed air volume reference value signal FV-ref on the electrical line 36. The desired powder mass reference value "m-ref" can be variably input into the computer 24 at an input 52. The total air volume reference value "GV-ref" can be variably input into the computer 24 at an input 54. The powder mass sensor 56, which can be housed in the injector 2 or arranged downstream from the injector 2 on the powder/air line 12, generates an electrical powder mass actual value signal m-actual as a function of the powder mass "m" conveyed by the total air stream (feed air plus any additional air) and transmits this to a powder mass actual value input 60 of the computer 24 by means of an electrical line 58. The computer 24 calculates a powder mass reference/actual comparison signal from the powder mass reference value signal m-ref at its input 52 and the powder mass actual value signal m-actual at its input 60, and uses this as a powder mass signal m1, m2, or the like on the powder mass diagram axis m to calculate the feed air volume FV1, FV2, or the like required at a total air volume GV1 or GV2, or the like, and then from this data calculates the related additional air volume reference value ZV-ref. The additional air volume reference value ZV-ref is the difference between the total air volume GV and the feed air volume FV-ref. In this way, the powder mass value "m" selected for the calculation on the powder mass diagram axis m is then only equal to the powder mass reference value m-ref input at the input 52 if the powder mass actual value m-actual of the powder mass sensor 56 is equal to the powder mass reference value m-ref. For the calculation of the various aforementioned values, the computer contains at least one processor and one data memory unit, in the usual manner.

An amount conveyed per time unit can also be referred to as a "rate". For this reason, the terms powder mass rate, feed air rate and additional air rate are also used in the following description. The computer 24 is furthermore provided with an input 62 so as to adjust a high-voltage reference value HS-ref, as a function of which the computer 24 sends a signal to adjust the high voltage by means of the electrical line 22 of the spray device 16. In this way, the entire powder feed device can be controlled and regulated from the computer 24, remote from the spray device 16 and remote from the volume flow regulators 32 and 34.

Figure 3:
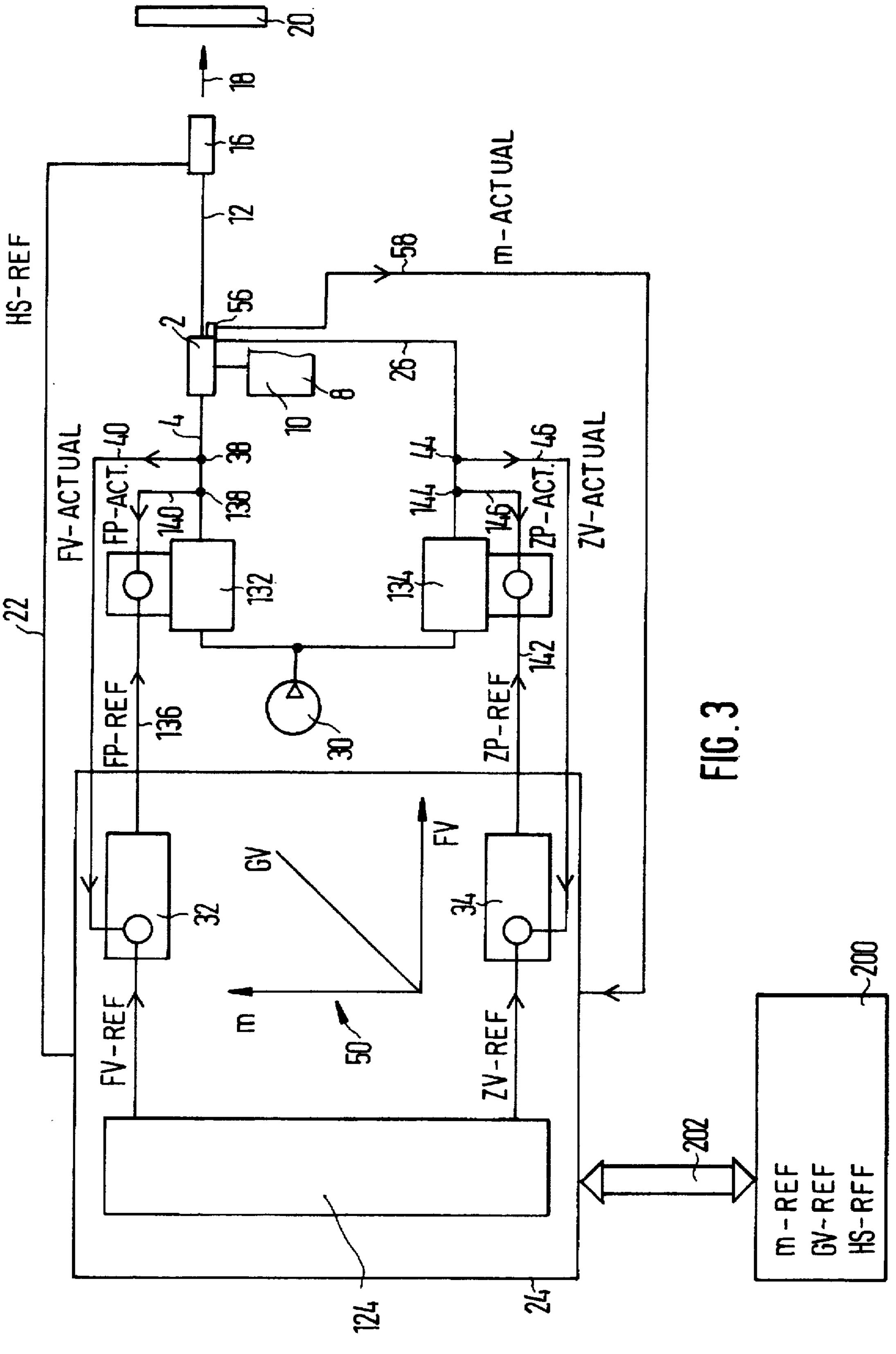
FIG. 3 is a schematic diagram of another embodiment of a powder feed system for supplying powder coating material as constructed according to the present invention, as part of a powder coating apparatus which contains several such powder feed systems, all of which are controlled from a common central control system.

In FIG. 3, parts which correspond to parts of FIG. 1 are provided with the same reference numbers. The embodiment of FIG. 3 is essentially the same, in terms of function, as the one in FIG. 1. There are differences, however, in that the feed air volume flow regulator 32 of FIG. 3 does not directly influence the feed air volume flow of the compressed air source 30 in the feed air line 4, but rather, the regulator 132 influences the air source 30 indirectly, in that the feed air volume flow regulator 32 does not generate the electrical feed air volume reference value signal FV-ref as in FIG. 1, but rather generates a feed air pressure reference value signal FP-ref which corresponds to the feed air volume reference value signal, and gives it to a feed air pressure regulator 132 by means of an electrical refe-rence value signal line 136, which lies in the compressed air path between the compressed air source 30 and the feed air line 4, whereas the feed air volume flow regulator 32 is ar-ranged at this location in FIG. 1. As another difference as compared with FIG. 1, in a similar manner, an additional air pressure regulator 134 instead of the additional air volume flow regulator 34 is arranged in the additional air path between the compressed air source 30 and the additional air line 26, and the additional air volume regulator 34, which continues to be present, generates an electrical additional air pressure reference value signal ZP-ref, corresponding to the electrical additional air volume reference value signal ZV-ref of FIG. 1, which is conducted to the additional air pressure regulator 134 by means of an electrical reference value line 142.

The feed air pressure regulator 132 receives electrical feed air pressure actual value signals FP-actual from a compressed air sensor 138 in the feed line 4, by means of an electrical feed air pressure actual value line 140, compares these actual value signals FP-actual with the electrical feed air pressure reference value signals FP-ref of the electrical feed air pressure reference value signal line 136 as transmitted from the feed air volume flow regulator 32 and regulates the feed air pressure, with which the feed air is passed to the injector 2 from the compressed air source 30, by means of the feed air line 4, as a function of the comparison result. The feed air volume flow regulator 32 receives electrical feed air volume actual value signals FV-actual from the feed air volume flow sensor 38 in the feed air line 4, by means of the electrical feed air volume actual value line 40, as in the embodiment shown in FIG. 1. In this manner, the feed air regulation of FIG. 3 is also "volume flow regulation".

The additional air pressure regulator 134 receives electrical additional air actual value signals ZP-actual from a compressed air sensor 144 in the additional air line 26, by means of an electrical additional air pressure actual value line 146, compares them with the additional air pressure reference value signals ZP-ref of the additional air pressure reference value line 142, and generates an additional air pressure, with which the additional air is passed to the additional air line 26 from the compressed air source 30, as a function of the comparison result. The additional air volume flow regulator 34 receives electrical additional air volume actual value signals ZV-actual from the additional air volume flow sensor 44 in the additional air line 26, by means of the electrical additional air volume actual value line 46, as in the embodiment shown in FIG. 1. In this way, the additional air regulation of FIG. 3 is also "volume flow regulation".

The feed air volume flow regulator 32 and the additional air volume flow regulator 34 can be structured in a manner corresponding to FIG. 1, outside the computer 24, as separate devices connected with it, or can be integrated into the computer corresponding to FIG. 3, and be formed partially or entirely by the software and/or hardware of the computer 24. In FIG. 3, the diagram 50 stored in the memory in the computer, and schematically, using a rectangle 124, the hardware and software of the computer 24 are shown as parts of the computer 24, along with the interdependence of the diagram 50, the feed air volume flow regulator 32 and the additional air volume flow regulator 34.

Here, the term "computer" means an electrical regulation device which can contain additional electronic or electrical elements in addition to the basic components of a processor, memory, input and output units.

A system for electrostatic powder coating normally has several spray devices 16. Each spray device requires the elements shown in FIGS. 1 to 3. However, the computer 24 can be structured in such a manner that a single computer 24 can fulfill the functions for all the spray devices 16.

FIG. 3 shows a central electronic control system 200 for several spray devices 16, each of which has its own computer 24. The computers are in bidirectional data exchange with the central control system 200, as is represented schematically in FIG. 3 by a double arrow 202. The computer 24 receives the powder mass reference value m-ref, the total air volume reference value GV-ref, and, if desired, also the high-voltage reference value HS-ref, which is the desired high-voltage value with which the spray device 16 is supposed to electrostatically charge the powder, from the central control system 200 in each instance.

Another modified embodiment can consist of an arrangement wherein the computer 24 is contained in the central control sys-tem.

Obviously, many modifications and variations of the present invention are possible in light of the above teachings. It is therefore to be understood that within the scope of the appended claims, the present invention may be practiced otherwise than as specifically described herein.

I claim:

1. A powder feed system for powder coating material, comprising:

a feed air line for conducting a feed air stream;

a container for containing powder coating material;

an injector operatively connected to said container and said feed air line such that as said feed air stream is conducted through said injector, said powder coating material disposed within said container is withdrawn from said container and entrained within said feed air stream;

an additional air line for conducting an additional air stream into said feed air stream;

a feed air regulator for regulating said feed air stream;

an additional air regulator for regulating said additional air stream;

a computer having a memory; and calibration diagram means stored within said computer memory for correlating a plurality of feed air rates, a plurality of powder feed rates, and a plurality of total air rates comprising feed air rates and additional air rates, wherein a feed air rate, required in connection with a predetermined total air rate, can be derived from said calibration diagram means as a function of a predetermined powder feed rate.

2. The system as set forth in claim 1, wherein:

said calibration diagram means comprises a graphical plot diagram with said plurality of powder feed rates disposed along a first axis of said diagram, said plurality of feed air rates are disposed along a second axis of said diagram, and said plurality of total air rates comprise a plurality of lines passing through the intersection of said first and second axes of said calibration diagram means.

3. The system as set forth in claim 1, further comprising:

powder rate reference value input means for inputting a predetermined powder rate reference value into said computer;

means for calculating a total air rate, comprising a feed air rate and an additional air rate, based upon said predetermined powder rate reference value input into said computer;

sensor means for generating a signal representing the actual powder rate value;

means within said computer for generating a feed air rate reference value and an additional air rate reference value as a function of said calculated total air rate and said actual powder rate value;

sensor means for generating a feed air rate actual value signal;

sensor means for generating an additional air rate actual value signal;

said feed air regulator means regulating said feed air as a function of said feed air rate reference value and said feed air rate actual value; and said additional air regulator means regulating said additional air as a function of said additional air rate reference value and said additional air rate actual value.

4. The system as set forth in claim 1, further comprising:

powder rate reference value input means for inputting a predeterminedly desired powder rate reference value into said computer;

total air rate reference value input means for inputting a predeterminedly desired total air rate reference value into said computer;

means within said computer for calculating a necessary feed air rate in connection with said predeterminedly desired powder rate reference value and said predeterminedly desired total air rate reference value input into said computer;

means within said computer for calculating the necessary additional air rate from the difference between said total air rate reference value and said necessary feed air rate; and means within said computer for generating a feed air rate reference value and an additional air rate reference value.

5. The system as set forth in claim 1, wherein:

said feed air regulator comprises a volume flow regulator which regulates feed air volume conveyed per unit of time.

6. The system as set forth in claim 5, further comprising:

feed air pressure regulator means for receiving electrical feed air pressure reference values from said volume flow regulator which correspond to feed air volume flow reference values which are generated by said volume flow regulator, and for regulating the pressure at which said feed air is conducted to said injector as a function of said feed air pressure reference values.

7. The system as set forth in claim 6, wherein:

said feed air volume flow regulator is incorporated within said computer.

8. The system as set forth in claim 1, wherein:

said additional air regulator comprises an additional air volume flow regulator which regulates additional air volume conveyed per unit of time.

9. The system as set forth in claim 8, further comprising:

additional air pressure regulator means for receiving electrical additional air pressure reference values from said additional air volume flow regulator which correspond to additional air volume flow reference values which are generated by said additional air volume flow regulator, and for regulating the pressure at which said additional air is conducted into said feed air stream as a function of said additinal air pressure reference values.

10. The system as set forth in claim 9, wherein:

said additional air volume flow regulator is incorporated fithin said computer.

11. The system as set forth in claim 1, further comprising:

a central control system connected to said computer for transmitting reference values for said powder feed rates and said total air rates.

12. The system as set forth in claim 4, further comprising:

a powder rate actual value sensor for generating an electrical powder rate actual value signal indicative of the powder rate actually present within said feed air stream and for transmitting said powder rate actual value to said computer; and means within said computer for generating a powder rate actual/reference comparison signal, derived from said powder rate actual value signal and said powder rate reference value, which serves as a predetermined powder feed rate from which said feed air rate may be calculated from said calibration diagram means.

13. A powder feed system for powder coating material, comprising:

a feed air line for conducting a feed air stream;

a container for containing powder coating material;

an injector operatively connected to said container and to said feed air line such that as said feed air stream is conducted through said injector, said powder coating material disposed within said container is withdrawn from said container and entrained within said feed air stream;

an additional air line for conducting an additional air stream into said feed air stream;

a feed air regulator for regulating said feed air stream;

an additional air regulator for regulating said additional air stream;

calibration diagram means for correlating a plurality of feed air rates, a plurality of powder feed rates, and a plurality of total air rates comprising feed air rates and additional air rates; and computer means, having a memory within which said calibration diagram means is stored, for generating a feed air rate signal to said feed air regulator, derived from said calibration diagram means as a function of a predetermined total air rate and a predetermined powder feed rate, and for generating an additional air rate signal to said additional air regulator, as a function of said predetermined total air rate and said derived feed air rate.

14. The system as set forth in claim 13, wherein:

said calibration diagram means comprises a graphical plot diagram with said plurality of powder feed rates disposed along a first axis of said diagram, said plurality of feed air rates are disposed along a second axis of said diagram, and said plurality of total air rates comprise a plurality of lines passing through the intersection of said first and second axes of said calibration diagram means.

15. The system as set forth in claim 13, wherein:

said predetermined powder feed rate comprises a powder rate reference value inputted into said computer by a powder rate reference value input means;

said predetermined total air rate comprises a total air rate reference value inputted into said computer by a total air rate reference value input means;

first sensor means for generating a signal representative of an actual powder feed rate; and means within said computer for generating a feed air rate reference value and an additional air rate reference value as a function of said predetermined total air rate and said actual powder feed rate.

16. The system as set forth in claim 15, further comprising:

second sensor means for generating a feed air rate actual value signal;

third sensor means for generating an additional air rate actual value signal;

said feed air regulator regulating said feed air as a function of said feed air rate reference value and said feed air rate actual value; and said additional air regulator regulating said additional air as a function of said additional air rate reference value and said additional air rate actual value.

17. The system as set forth in claim 16, wherein:

said feed air regulator comprises a volume flow regulator which regulates feed air volume conveyed per unit of time.

18. The system as set forth in claim 16, wherein:

said additional air regulator comprises an additional air volume flow regulator which regulates additional air volume conveyed per unit of time.

19. A powder feed system for powder coating material, comprising:

a feed air line for conducting a feed air stream;

a container for containing powder coating material;

an injector operatively connected to said container and to said feed air line such that as said feed air stream is conducted through said injector, said powder coating material disposed within said container is withdrawn from said container and entrained within saif feed air stream;

an additional air line for conducting an additional air stream into said feed air stream;

at least one feed air regulator for regulating said feed air stream;

at least one additional air regulator for regulating said additional air stream;

calibration diagram means for correlating a plurality of feed air rates, a plurality of powder feed rates, and a plurality of total air rates comprising feed air rates and additional air rates; and computer means, having a memory within which said calibration diagram means is stored, for generating a feed air rate signal to said at least one feed air regulator, derived from said calibration diagram means as a function of a predetermined total air rate and a predetermined powder feed rate, and for generating an additional air rate signal to said at least one additional air regulator, as a function of said predetermined total air rate and said derived feed air rate.

20. The system as set forth in claim 19, wherein:

said at least one feed air regulator and said at least one additional air regulator both comprise volume flow regulators which respectively regulate feed air volume conveyed per unit of time and additional air volume conveyed per unit of time.

* * * * *